F. X. MALOCSAY.
AUTOMATIC FEEDING DEVICE FOR BAND CUTTING MACHINES.
APPLICATION FILED NOV. 24, 1915.

1,257,507.

Patented Feb. 26, 1918.

Inventor
Francis X. Malocsay
By his Attorney

F. X. MALOCSAY.
AUTOMATIC FEEDING DEVICE FOR BAND CUTTING MACHINES.
APPLICATION FILED NOV. 24, 1915.

1,257,507.

Patented Feb. 26, 1918.
9 SHEETS—SHEET 6.

Inventor
Francis X. Malocsay
By his Attorney

F. X. MALOCSAY.
AUTOMATIC FEEDING DEVICE FOR BAND CUTTING MACHINES.
APPLICATION FILED NOV. 24, 1915.

1,257,507.

Patented Feb. 26, 1918.
9 SHEETS—SHEET 7.

Inventor
Francis X. Malocsay
By his Attorney
Joseph L. Levy

F. X. MALOCSAY.
AUTOMATIC FEEDING DEVICE FOR BAND CUTTING MACHINES.
APPLICATION FILED NOV. 24, 1915.

1,257,507.

Patented Feb. 26, 1918.
9 SHEETS—SHEET 8.

Inventor
Francis X. Malocsay
By his Attorney

F. X. MALOCSAY.
AUTOMATIC FEEDING DEVICE FOR BAND CUTTING MACHINES.
APPLICATION FILED NOV. 24, 1915.

1,257,507.

Patented Feb. 26, 1918.
9 SHEETS—SHEET 9.

Inventor
Francis X. Malocsay
By his Attorney

UNITED STATES PATENT OFFICE.

FRANCIS X. MALOCSAY, OF NEW YORK, N. Y., ASSIGNOR TO THE FIRM OF WM. STEINER SONS & CO., OF NEW YORK, N. Y.

AUTOMATIC FEEDING DEVICE FOR BAND-CUTTING MACHINES.

1,257,507.   Specification of Letters Patent.   Patented Feb. 26, 1918.

Application filed November 24, 1915. Serial No. 63,298.

*To all whom it may concern:*

Be it known that I, FRANCIS X. MALOCSAY, a citizen of the United States, and a resident of the city of New York, county of Bronx, and State of New York, have invented a new and useful Improvement in Automatic Feeding Devices for Band-Cutting Machines, of which the following is a specification.

The object of my invention is to provide a device of this class which will receive a number of strips, all duly lithographed, and cut these strips so that each lithograph will be a cigar band. As these lithographs are somewhat irregular and are not all spaced the same distance, a further object is to provide a feed which will be suitable for the particular lithographs being cut. A further object is to stop the cutting member of the machine after the bands are cut, restore the carriage to its initial position so that it will be ready to receive other bands, and then let it rest until the machine is again started. These, and other objects are accomplished by my invention, one embodiment of which is hereinafter more particularly set forth.

It will be noted that Figs. 20 and 19 show the relationship between the lithographed strip and the master strip.

Throughout the various views of the drawings, similar reference characters designate similar parts.

A band cutting machine of the conventional type 1 is provided with the usual frame 2 mounted on any suitable support, such as a floor, and a carriage 3 which is slidably mounted and adapted to pass under the die 4, which is mounted in the conventional way on a suitable block 5 fixed to a crosshead 6 that reciprocates between guides 7 at the upper end of the frame 2, and this crosshead 6 is connected in the conventional way, to a pitman 8 mounted on an eccentric 9 on the main shaft 10, in the usual manner. This main shaft 10 is journaled at the top of the frame 2, in the usual way, and carries a friction or other clutch 11 and brake, main driving pulley 12, which also carries a small grooved pulley 13, for a purpose which will appear below, and the shaft 10 has fixedly mounted thereon a suitable sprocket wheel 14. The main pulley 12 runs idle on the shaft 10 unless connected therewith by the clutch 11, in which event the pulley will drive the shaft until the clutch is disconnected. The clutch 11 is thrown into action by means of the foot pedal 15 pivoted near the bottom of the base 2 at 16, and this treadle is provided at its inward end with a suitable vertical rod 17 which runs to this clutch 11, so as to actuate the same, in the conventional manner.

Near its forward end, the treadle 15 is pivotally connected to the vertically disposed link 18 which runs to a crank 19, to which it is pivotally connected, and this crank is fixed on a shaft 20 which runs transversely of the machine and is mounted in suitable bearings in the frame 2.

Figure 9:
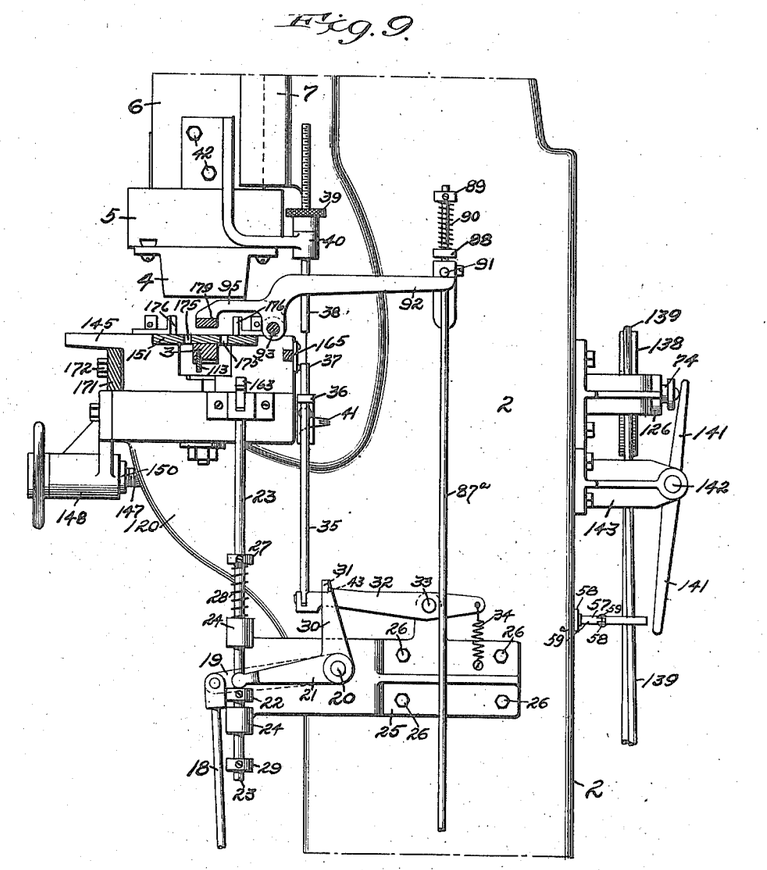
Fig. 9 is an enlarged side elevation view of a portion of the machine, looking toward the left of Fig. 1, with parts shown in section to more clearly reveal the structure.
Figure 10:
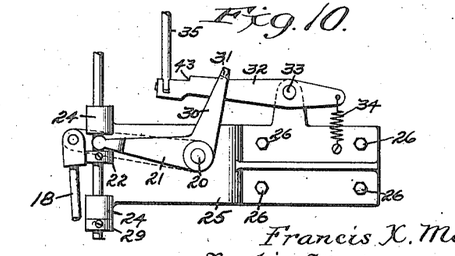
Fig. 10 is a detailed side elevation view of a portion of the actuating mechanism.

At the right hand end, see Figs. 9 and 10, the shaft 20 carries a bell crank lever 21, which has one end adapted to engage the upper surface of a collar 22 on the vertically disposed rod 23. This rod 23 moves in the direction of its length in suitable guides 24, on the bracket 25, which is secured to the frame 2 by bolts 26, or other suitable means. The rod 23 also has an adjustably mounted collar 27, which is engaged by a coil spring 28, and this spring also rests on the upper guide 24 so as to normally keep the rod 23 in an elevated position. A stop collar 29 limits the upper movement of this rod by engaging the bottom of the lower guide 24. When the foot treadle 15 is depressed, the bell crank lever 21 is shifted anti-clockwise, as shown in Fig. 9, and thereby lowers the rod 23, for a purpose that will be described below.

The upwardly extending arm 30 of the bell crank lever 21 has a laterally extending projection 31 which takes over a lever 32 fulcrumed at 33 on a suitable ear extending from the bracket 25, and provided at its free end with a coil spring 34, which is also connected to the bracket 25, and at its other end this lever is pivotally connected to a rod 35, which runs through a suitable guide 36 where it ends at 37, and at times engages another rod 38 with screw threads at its top and an adjusting nut 39 which rests on a bracket 40, mounted on the crosshead 6 of the machine. A spring 41 mounted on the rod 35 near its upper end and also on the bracket 36 which is secured to the frame 2, normally holds the bar 35 out of alinement with the rod 38. The bracket 40 is secured to the crosshead 6 by means of suitable cap screws 42, or other suitable means. When the rod 38 descends on the bar 35, as it does when all the bands in a strip have been cut, the lever 32 is moved downwardly at its forward end, and thereby releases the lever 21, which can then assume the position shown in Fig. 10.

When the foot-treadle 15 is depressed and the bell crank lever 21 shifted from the position shown in Fig. 10 to that shown in Fig. 9, the projection 31 engages a suitable shoulder 43 on the lever 32, so that the bell crank lever 21 is secured in the position shown in Fig. 9, until released by the lowering of the forward end of the lever 32, and then the spring 28 raises the rod 23 and shifts the lever 21 clockwise to the position shown in Fig. 10. The shifting of the lever 21 turns the shaft 20, raises the arm 19, link 18, foot-pedal 15 and lowers the link 17 and thereby stops the rotation of the shaft 10 by the action of the clutch 11.

Figure 1:
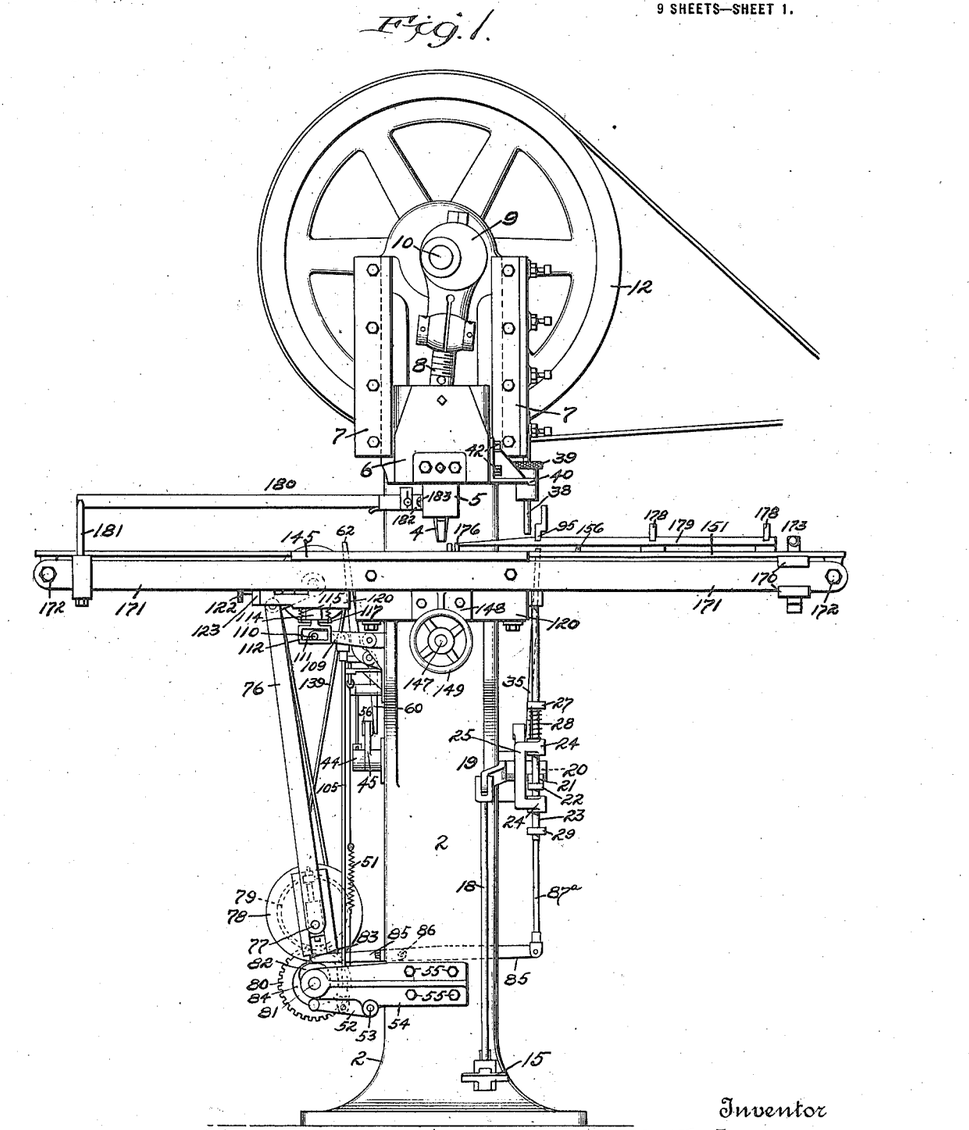
Figure 1 is a front elevation of a band cutting machine provided with my improvement.
Figure 2:
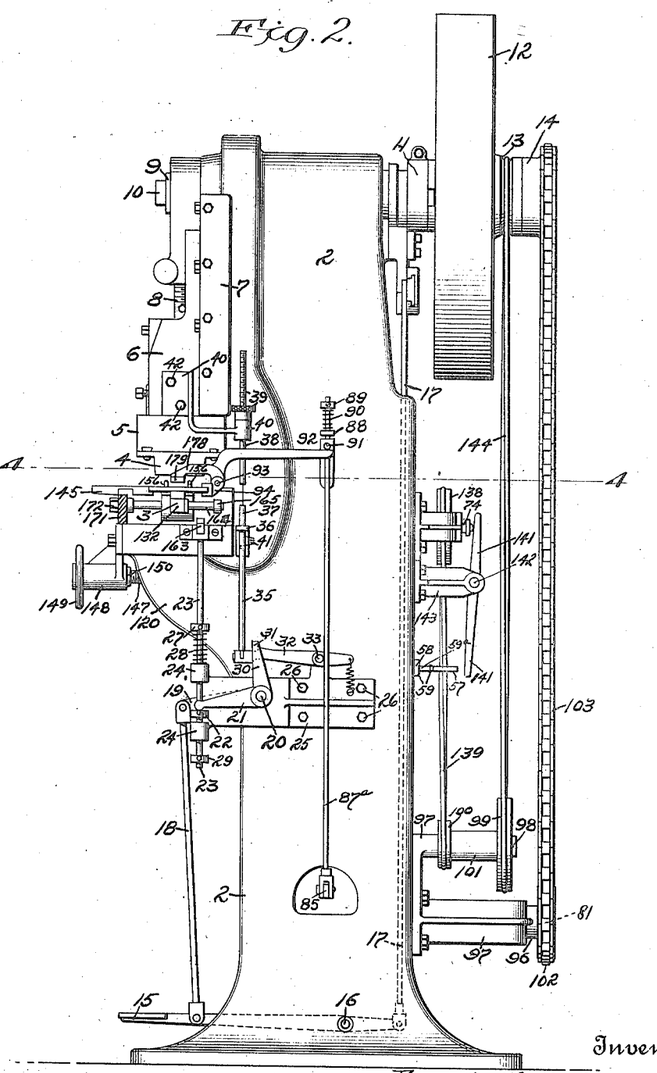
Fig. 2 is a side elevation, taken at the right of Fig. 1.
Figure 3:
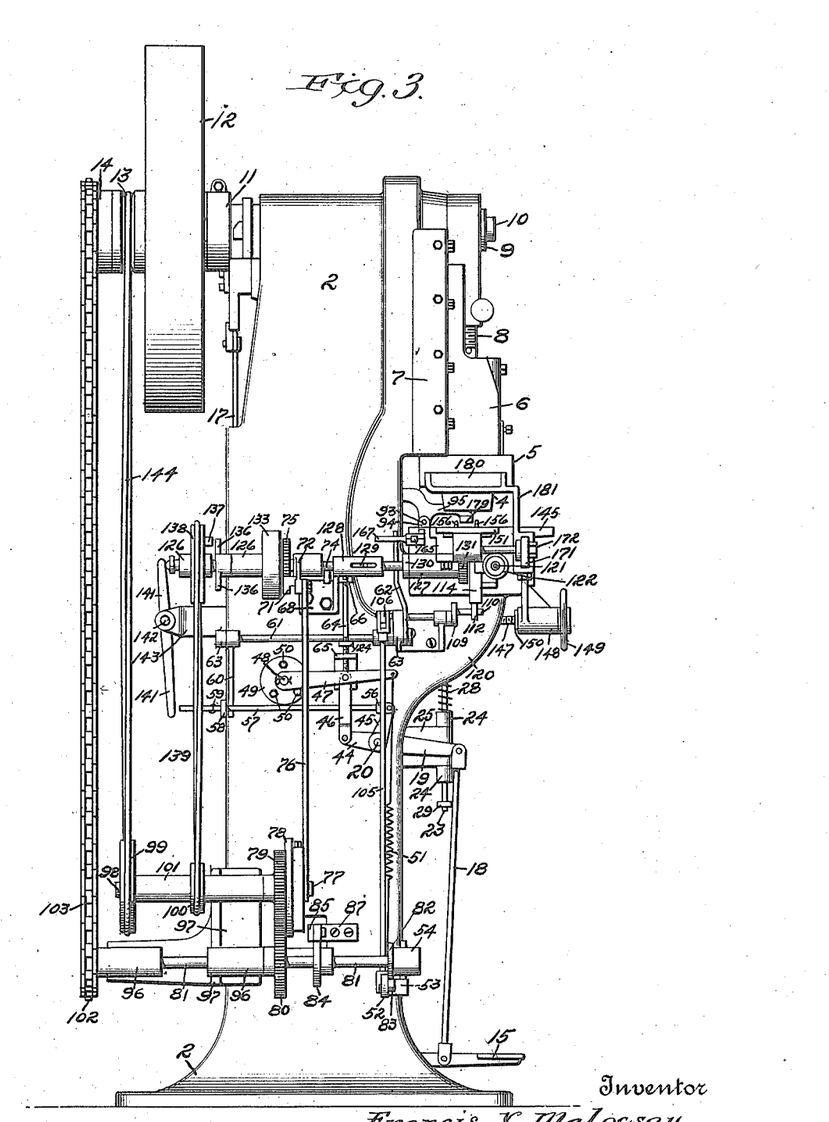
Fig. 3 is a side elevation, taken at the left of Fig. 1.
Figure 4:
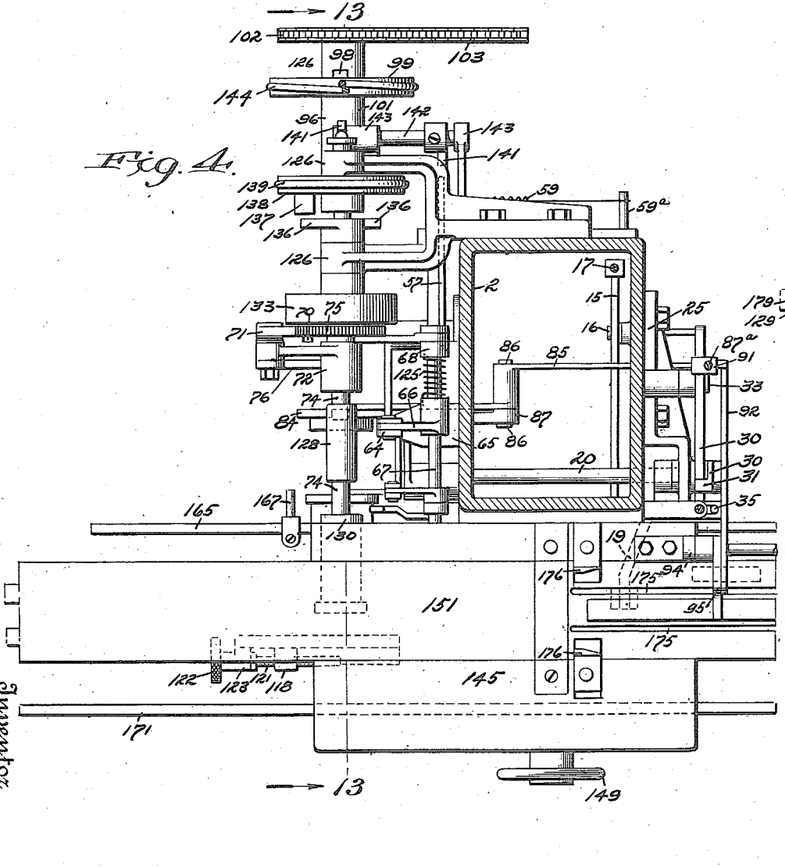
Fig. 4 is a sectional view, taken on the line 4—4, of Fig. 2, looking in the direction of the arrows.
Figure 5:
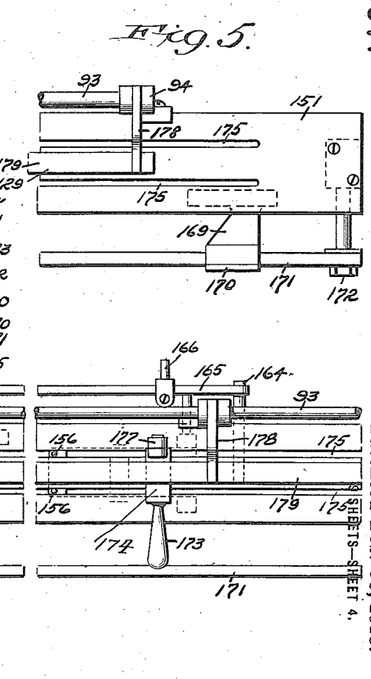
Fig. 5 is a detailed top plan view of a portion of the carriage bed located at the right of the machine as viewed in Fig. 1.
Figures 11, 12:
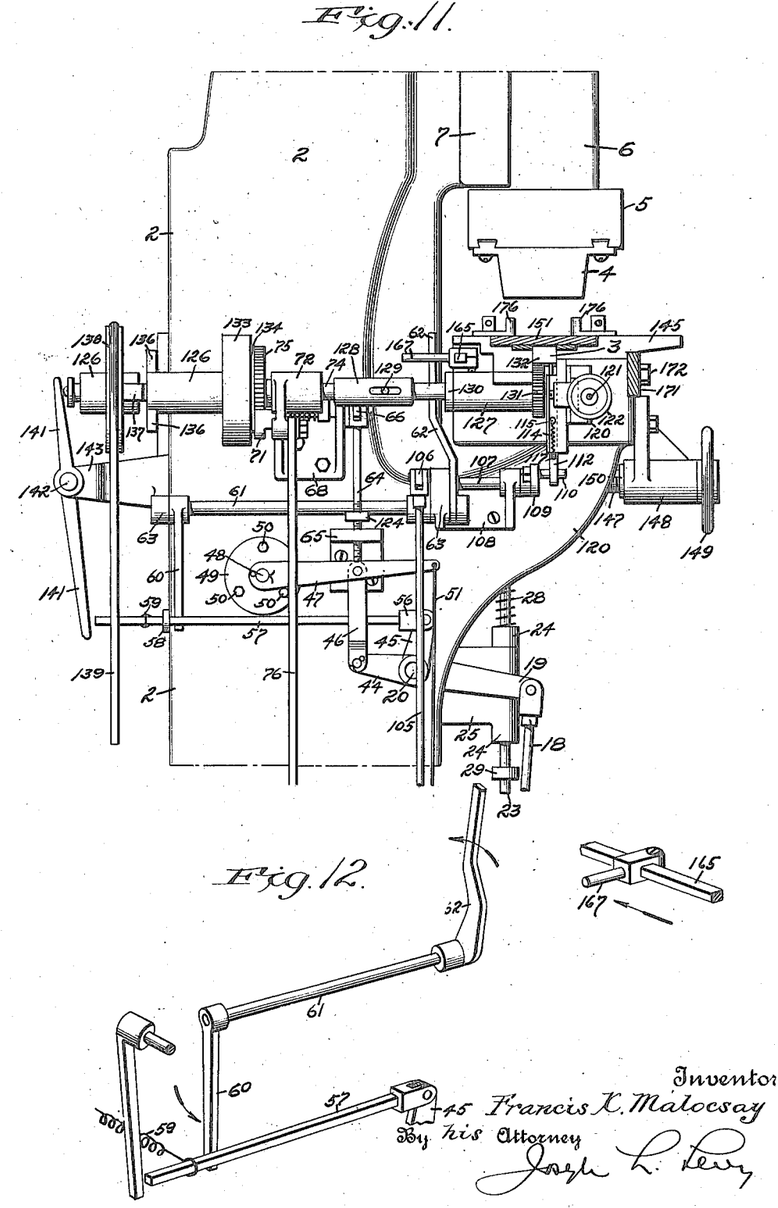
Fig. 11 is an enlarged side elevation view of the portion of the machine as in Fig. 3 with parts in section.
Fig. 12 is a detailed perspective view of a portion of the carriage controlling mechanism of the machine.

The end of the shaft 20 which has not been considered, that is the end at the left of Fig. 1, which is shown in Figs. 3 and 11, is provided with two cranks, one 44 extending horizontally, and another 45 extending in a nearly vertical direction. The crank 44 is pivotally connected to a suitable link 46, and this in turn is pivotally connected to a lever 47 fulcrumed at 48 in a bracket 49, secured by cap screws 50 to the frame 2, or in any other suitable manner. The free end of this lever 47 is provided with a suitable spring 51 which has its lower end secured to a lever 52 fulcrumed at 53 in a bracket 54, which is secured by cap screws 55 to the frame 2.

The crank 45 is connected to a clevis 56, in the conventional manner, and this clevis is connected to a rod 57 which may be shoved in the direction of its length by the crank 45 when the lever 19 is raised. One end of this rod 57 is mounted in a suitable slide 58, and this slide is so arranged that this rod has a slight transverse movement, either under the influence of a spring 59, or under the influence of a crank 60 (see Fig. 12) which acts in opposition to the spring 59, and this crank is fixed to a shaft 61, which shaft also carries a second crank 62, which extends far enough to engage the stop on the bed of the machine, for a purpose that will appear below. The spring 59 has its other end secured to a post 59ª on the frame 2. The shaft 61 is journaled in suitable bearings 63 mounted on the frame 2 of the machine. As will appear below, when the rod 57 is thrust to the rear, the lever 141 is shifted so as to reverse the movement of the carriage 3.

Above the link 46 and adapted to rest on the lever 47, immediately above its pivotal connection, is a rod 64 which has its lower end guided by a bracket 65, and its upper end articulating with a crank 66, (see Fig. 15) and this crank is fixed to a small shaft 67 and suitably mounted in a bracket 68, and this shaft 67 is also provided with a second arm 69, which extends far enough to engage with a pin 70 on a spring pressed pawl 71, carried on a link 72, by a pivot 73, and this link 72 has one end mounted on a shaft 74 to which is loosely mounted a ratchet 75, and the free end of the link 72 is pivotally connected to a link 76 which runs to an adjustably mounted crank pin 77, mounted on a suitable disk 78, in the usual manner, and this disk 78 is fixed to a gear wheel 79 which runs freely on a stud shaft, not shown, and meshes with a corresponding gear wheel 80 with the same number of teeth fixed to a suitable shaft 81. For convenience, this shaft 81 will be called a cam shaft, because it carries one cam 82 which is adapted to engage a roller 83 on the lever 52, above described, under the tension of the spring 51. It also carries a second cam 84 which engages a cam roller on a lever 85, which is fulcrumed at 86 on a bracket 87, which extends inwardly from the casing 2, (see Fig. 14). The lever 85 extends beyond the fulcrum 86 to a link 87ᵃ with which it is pivotally connected, in the conventional manner, and this link 87ᵃ runs upwardly to above the level of the bed of the machine, and finally reaches a guide 88 through which it passes. The link 87ᵃ is provided with an adjustably mounted collar 89 which surmounts a coil spring 90, which also rests on the guide 88. The link 87 also carries an adjustably mounted collar 91 which carries a pin resting over an arm 92, which is pivoted at 93 on a bracket 94 adjacent to the table 151, and has an end 95 extending over this table to actuate a clamp to hold strips true while being severed, as will appear below.

The shaft 81 is suitably journaled in bearings 96, extending from a bracket 97, and also in the bracket 54, which has been described above. The bracket 97 carries the stud shaft on which the gear 79 is mounted, and has a second stud shaft 98, which also carries two grooved pulleys 99 and 100 respectively, and these pulleys are connected by a sleeve 10 to which they are attached so that these pulleys and the sleeve will all revolve together.

The shaft 81 is driven by a sprocket wheel 102 which is fixed thereon and connected to a chain 103, of the conventional kind, which also engages with the sprocket wheel 14. The sprocket wheel 102 and the sprocket wheel 14 have the same number of teeth so that the shaft 81 has the same identical annular movement as the shaft 10.

Figures 14, 15:
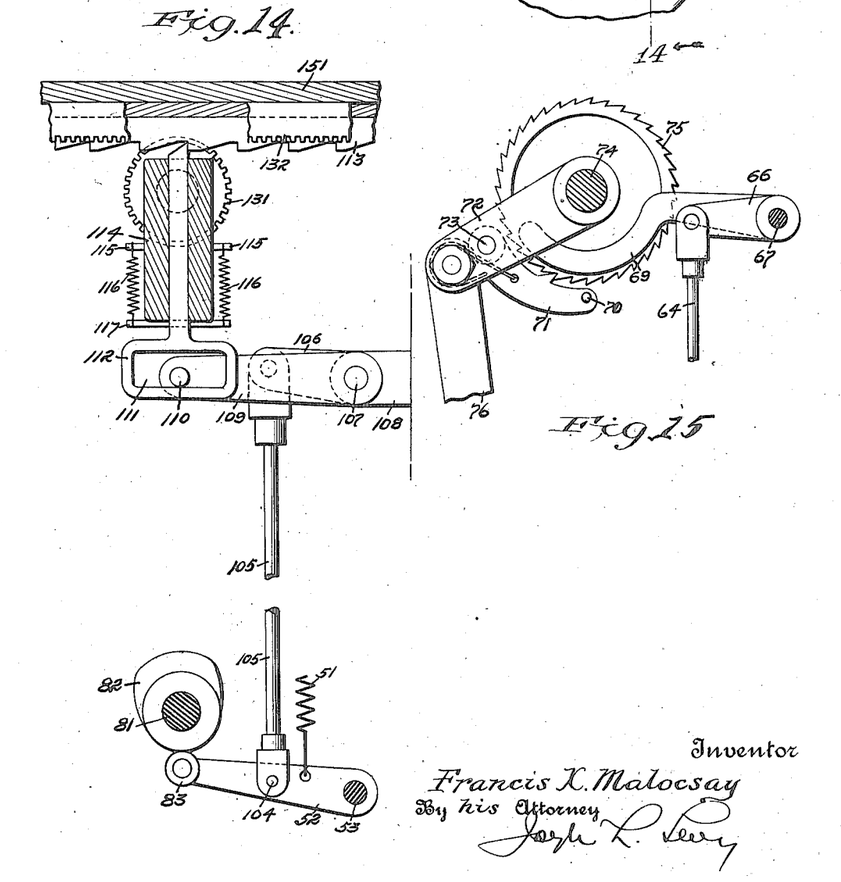
Fig. 14 is a sectional view, taken on the line 14—14 of Fig. 13, looking in the direction of the arrows.
Fig. 15 is a detailed view showing a portion of the mechanism for feeding the carriage forward and parts connected therewith.

From the foregoing, it will be apparent that when the arm 69 is lowered so as to engage the pin 70 on the pawl 71, this pawl will be thrown out of engagement with the ratchet wheel 75 and will not actuate the same. When the arm 69 is raised, as it always is when the rod 64 is raised, the pawl 71 will engage the ratchet wheel 75 and actuate the same as long as the link 72 is oscillated by the link 76 and this link 76 is shifted by the crank pin 77, the length of the throw depending upon the eccentricity of this adjustably mounted pin. It will be observed that the teeth of this ratchet wheel 75 are so arranged that the wheel 75, when viewed as shown in Fig. 15, is shifted anticlockwise. The crank 52 has, near the spring 51, as shown in Fig. 14, a pin 104 on which is mounted a link 105 which runs to a suitable crank 106, with which it is pivotally connected, and this crank is fixed to a shaft 107, mounted in a bracket 108, and provided with a second crank arm 109 which has a crank pin 110 adapted to enter a recess 111 in a slide 112 which has its upper end beveled so as to form a pawl which can enter the irregular teeth of the master strip 113, which is mounted on the carriage 3, in a manner which will be described below. The pawl 112 is guided by a suitable guide 114, which has laterally extending ears 115 which engage suitable coil springs 116, one at each side, and the lower ends of these coil springs engage a bar 117 fixed to the pawl 112, so that the cam 82 may lower the link 105 and thereby cause the pin 110 to lower the pawl 112. As soon as the pin 110 is raised the springs 116 will cause the pawl 112 to fly upwardly and engage the master strip 113.

The guide 114 has a laterally extending lug 118 adapted to extend through a recess 119 in the bracket 120, extending laterally from the frame 2 of the machine, and this lug 118 is screw-threaded and receives a screw 121 which has its knurled head 122 in a convenient location so that this screw may be turned. The extension 120 has a suitable ear 123 in which this screw 121 is mounted so that by turning this screw through the head 122, the pawl 112 may be placed in any desired position with regard to the master strip 113.

The rod 64 is preferably screw-threaded at its lower end where it passes through the guide 65, and is provided with a suitable nut 124 so that its lowest position may be determined and controlled, and a coil spring 125 on the shaft 67 has one end in the bearing 68 and the other in the arm 66 so that it tends to depress this arm and force the arm 69 against the pin 70 whenever the lever 47 is lowered, as it always is when the lever 19 is raised.

In the foregoing has been described the means connected with the link 76 for actuating the ratchet 75. The connections between this ratchet and the shaft 74, on which it is mounted, will now be described, as well as the mounting of this shaft. The shaft 74 is journaled in suitable brackets 126 and 127, the former being at the rear and the latter adjacent to the bed 3, and this shaft carries a sleeve 128 fixed near its middle to one section and provided with a pin and slot connection 129 with the other so as to make this shaft sufficiently extensionable for the adjustment through the screw 147 described below. A collar 130 set against the bearing 127 tends to keep the extreme end of the shaft 74 in position, as this shaft is opposed by a gear 131 fixed to the extreme forward end of this shaft and meshes with suitable teeth in the rack 132 of the carriage 3. Near the bearing 126 the shaft 74 has fixed thereon a suitable cup 133 adapted to receive a corresponding projection 134 which is held to the gear 75 by cap screws 135, or similar means. The parts 133 and 134 have a frictional engagement only so that they can slip one with regard to the other whenever power is applied to the shaft 74 through the pawl and ratchet connection 71, 75 and the pawl 112 is raised so as to engage the guide 113 and prevent further movement of the slide 3 under the action of the said ratchet 75.

Figure 13:
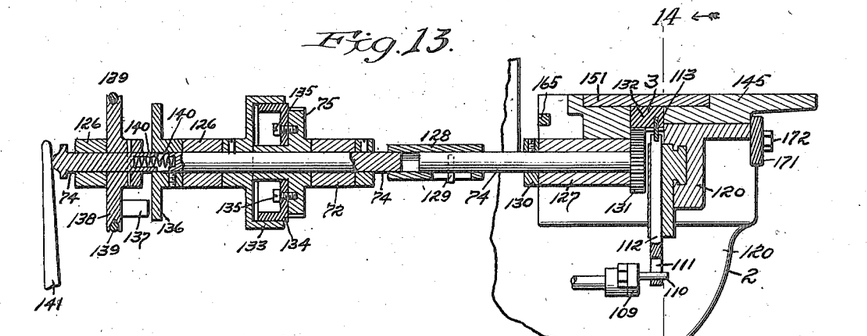
Fig. 13 is a sectional view, taken on the line 13—13 of Fig. 4, looking in the direction of the arrows.

At the rear end the shaft 74 is again divided between the parts of the bearing 126 and on one side of the division, near the cup 133 is provided the laterally extending lugs 136 which may engage a corresponding lug 137 extending from the edge of a pulley 138 which is driven by a cross belt 139, which also runs over the pulley 100. The pulley 138 is mounted on the extreme end of the shaft 74, and this extreme end is made hollow to receive a spring 140 which tends to separate the intermediate portion of the shaft 74 from the extreme end, as shown in Fig. 13. This extreme end of the shaft 74 will also slide in the bearing 126 against the tension of this spring when pressed by a lever 141 fulcrumed at 142 in a bracket 143 running laterally from the frame 2 of the machine, and this lever 141 is arranged and disposed by having its ends offset from each other so that this lower end may be engaged by the bar 57 when thrust to the rear, and will not be engaged when the crank 60 is shifted by the arm 62, as above described, against the tension of the spring 59.

The pulley 100 is driven by the sleeve 101, and this in turn is driven by the pulley 99, which is driven by the cross belt 144 which runs to the pulley 13 on the shaft 10. It will be understood that this pulley revolves with the pulley 12 and without regard to the shaft 10 so that this shaft may or may not be revolving when this pulley revolves.

Figure 16:
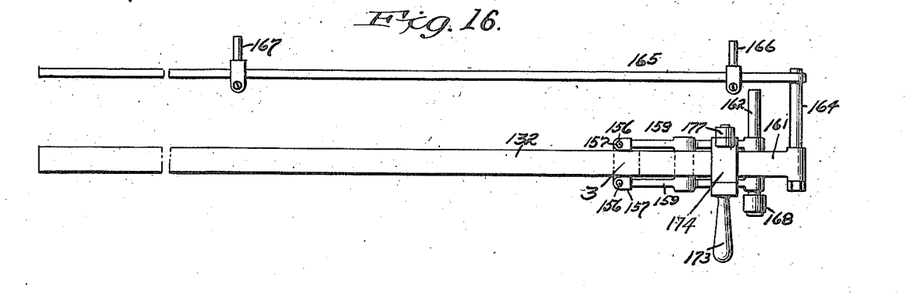
Fig. 16 is a detailed plan view of the carriage.
Figure 17:
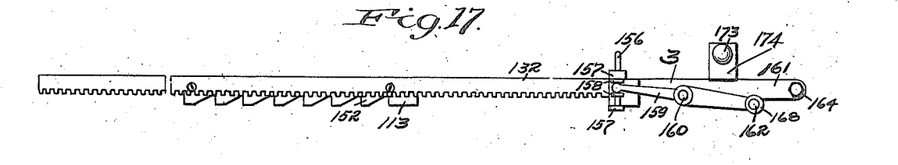
Fig. 17 is a side elevation of the carriage.
Figure 19:
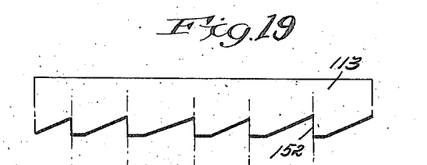
Fig. 19 is an enlarged detailed view of the master strip.
Figure 20:
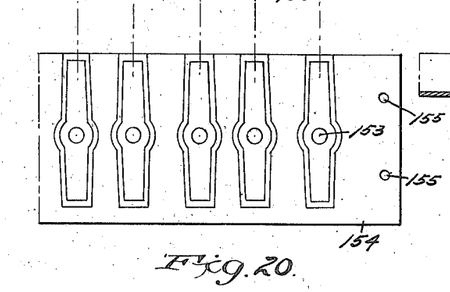
Figs. 20 and 21 show the bands before and after severing.
Figure 21:
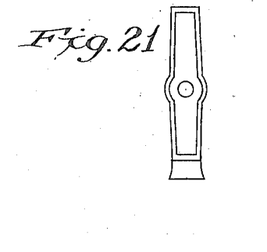

The bracket 120 has suitable guides 145 for carrying the carriage 3. This guide 145 has a downwardly extending projection 146, (see Fig. 8) the lower end of which is screw-threaded to receive a screw 147, which also goes through a bracket 148 where no screw threads are provided, to a hand-wheel 149. A suitable integral collar 150 is on one side of the bracket 148 and the hand-wheel 149 is on the other, so that the screw 147 cannot move in the direction of its length and the bracket 148 is fixed to the projection 120 of the frame 2, so that by turning this wheel 149 the guide 145 and carriages may be shifted transversely so as to permit any necessary adjustment and insure a proper cutting by the die 4. The carriage 3 is under the slotted table 151 and has a rack 132 which meshes with the pinion 131 driven by the shaft 74, in one direction by the ratchet 75 for the forward feed and in the reverse direction by the pulley 138 for the return movement. This carriage will best be understood by referring to Figs. 16 and 17, where it is shown detached. It consists essentially of a rack bar 132 which is slotted to receive the master strip 113, cut as indicated in Fig. 19, so as to have its laterally extended surfaces or teeth 152 in alinement with centers 153 of each lithograph on the paper band or strip 154. It will be understood that all these bands or strips are uniform and are kept in alinement by suitable perforations 155, near each end, which are adapted to receive pins 156 mounted on each side of the rack 132 between laterally extending ears 157. The pins 156 have collars 158 fixed thereon and these collars on each pin engage the opposite sides of a lever 159 fulcrumed at 160 in ears on the underside of an extension 161 of the rack bar 132. These levers 159 are extended to a cross-bar 162 which runs rearwardly and laterally so as to engage a cam 163, which is fixed to the upper end of the bar 23 so that when this bar is raised, as above described, this projection 162 is engaged and raised so as to lower the pins 156. This occurs at the end of the movement of the carriage 3 and after all the bands have been cut from the strips in the machine so that what is left of these strips will not be secured on the carriage 3, but may be ejected, leaving clear surfaces for the next strips. The pins 156 move in slots 175 of the table 151.

At the right end of the extension 161 is found the bolt 164 which carries a bar 165 which runs parallel to the rack 132 and carries two adjustably mounted stops 166 and 167, the former, that is the stop 166, to engage the rod 37 and force it under the rod 38 when the machine is operating on the last bands to be cut from the strips in the machine, and the latter, that is the stop 167, engages the arm 62, see Fig. 12, so as to cause it to shift and thereby make the rod 57 disengage the lever 141 which will cause the pulley 138, with its projection 137, to get clear of the projection 136, and thereby stop the return movement of the carriage, as will more fully appear below in the description of the operation of the machine.

Figures 6, 7:
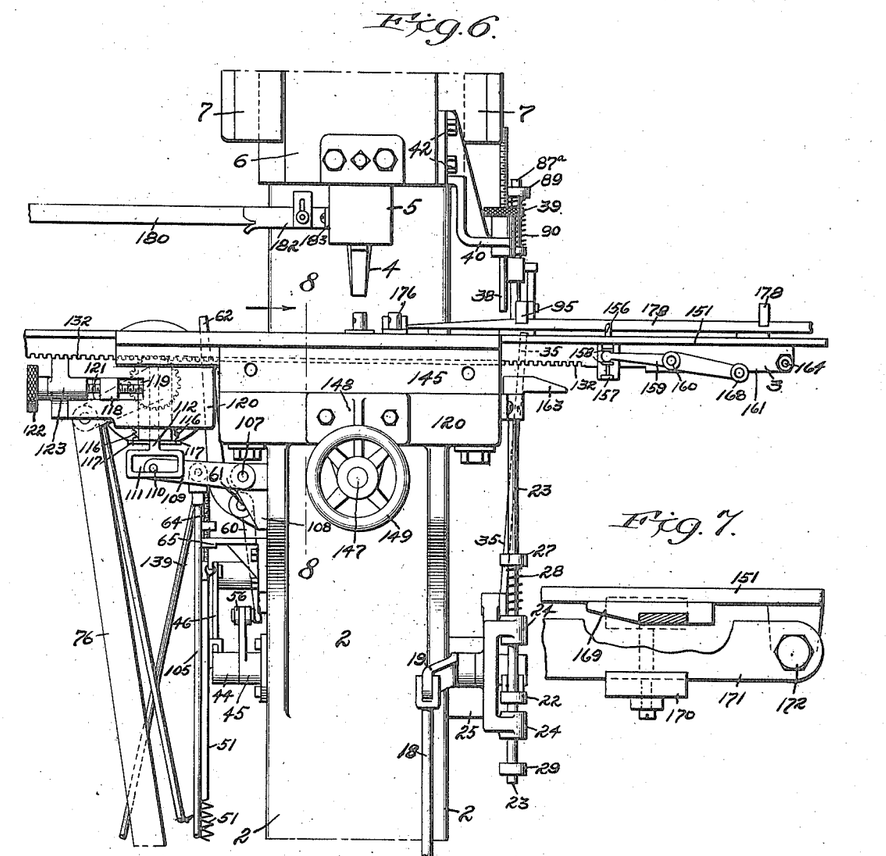
Fig. 6 is an enlarged front elevation of the central portion of the machine, the carriage supporting bar being removed.
Fig. 7 is a detailed side elevation, partly in section, of a portion of the carriage bed, showing the cam block for locking, in the upper position, the pins for holding the paper strips.

To prevent the pins 156 from being lowered when the lithograph cards 154 are put in place, the cross bar 162 carries a roller 168 which engages a guide 169 with clamps 170 mounted adjustably (see Fig. 7) on a bar 171 supported from the table 151 and the guide 145, by bolts 172, at each end, and also near the middle. The roller 168 is out of engagement with the guide 169 soon after the pins move forward toward the die 4.

The pins 156 move with the rack 132, as above described, and may be shifted by a handle 173, which is mounted on uprights 174 which are in alinement with the pins 156 so as to move in the same slots 175 of the table 151.

Figure 8:
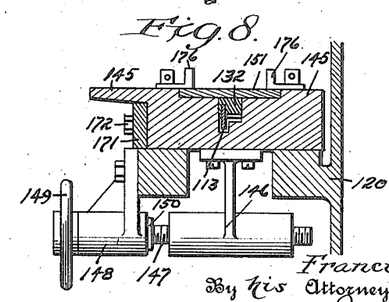
Fig. 8 is a sectional view, taken on the line 8—8, of Fig. 6, looking in the direction of the arrows.

This table 151 extends the length of the bar 171 and over the guide 145 which is grooved to receive the same on its upper surface, as shown in Fig. 8. And above these grooves are provided suitable, adjustable strip guides 176 which are secured to the guide 145 and extend over the table 151 so as to direct the lithograph strips 154 while being fed and hold them while being cut by the die 4.

Near the handle 173 and across the carriage 3, and at the rear of the same is mounted a suitable roller 177 which is adapted to engage the upper surface of the table to facilitate the movement of the carriage 3.

It will be noted that when the pins 156 move these strips 154 along the table 151, which is fixed, the movement takes place between the guides 176 and when these strips 154 are at rest and being cut, it is necessary to clamp them securely. To permit this free movement and clamping, mechanism is provided which will now be described.

These arms 178 are united at their outer ends by a bar 179, which runs parallel to the table 151 and is raised or lowered by the shifting of the pivot 93 in its bearings 94, as above described. It will be noted that when the bands are cut from the strips, the strips are held between the vertical guides 176 on the table 151 by the clamp bar 179 and the pins 156. These, by acting together, as above set forth, clamp these strips so that they will not shift under the pressure of the die, so that each band is cut true. The bar 179 is raised when the strips 154 are shifted.

Figure 18:
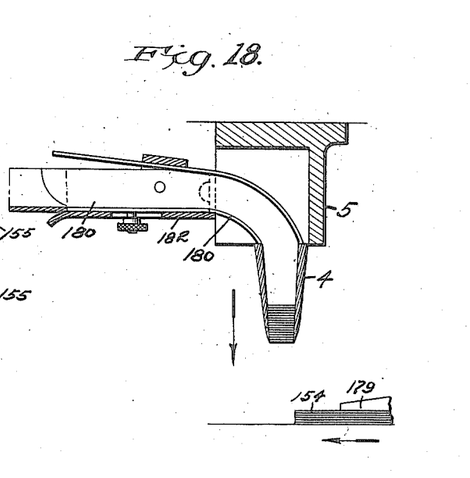
Fig. 18 is a detailed cross-section view of the cutting die and the parts connected thereto.

The mechanism for cutting will now be set forth. The die 4 may be made in any suitable way and is preferably made hollow, as shown in Fig. 18, and mounted in the block 5, which is also hollow, as shown in said figure, and on top of the die 4 and in the block 5 is placed one end of the guide 180 which has its other end supported by the bar 171, as shown in Fig. 1, by means of a suitable support 181 adjustably mounted on said bar. The connection between the guide 180 and this support 181, is a pivoted one and this guide has telescoping parts so that its end at the die 4 may rise and fall with the die and not separate or become detached so that the complete bands may be received in due order into the trough or guide 180, and from thence they can be readily removed. The guide 180 is preferably secured to the block 5 by means of a sleeve 182 with laterally extending ears 183, which are secured to this block.

*Operation.*

In view of the foregoing, the operation of my device will be readily understood. Assuming that the parts are ready to receive the pile of lithograph strips and the pins 156 are at the rear of their run, and that the master strip 113 is in place which conforms to these strips, as above described, the perforations in these strips are first placed over the pins 156 and then the foot-treadle 15 is pressed and thereby starts the shaft 10 from the pulley 12, which is always rotating when the machine is in use. As soon as the treadle 15 is pressed and the shaft 10 begins to rotate, power is received at the shaft 81 through the sprockets 14 and 102 and sprocket chain 103, and from this shaft 81 power is given to the gears 80 and 79 and from thence transmitted through the pitman 76 to the pawl and ratchet mounted on the shaft 74, so that this shaft is intermittently turned according to the throw of the link 76, which is determined by the eccentricity of the adjustably mounted crank pin 77, so that the carriage 3 is fed forward and with it the strips 154 which slide on the table 151, and between the guides 176. The teeth in the master strip 113 determine the amount of movement as the throw of the link 76 always tends to give a greater movement to the shaft 74 than the length of these teeth permit, and the pawl 112 is raised and lowered, as above described, so as to limit this movement to the exact distance required by the lithographs on the strips, the friction parts 133 and 134 sliding enough on each other to compensate for the difference. This intermittent cutting and feeding of the strips 154 can be stepped with the reciprocations of the cutting die 4 so that the bands are regularly cut, as above described during the periods of dwell, although the length of feed varies where the designs are not regularly placed on the strips 154. This feed continues until the stop 166 comes against the bar 35 and throws it in alinement with the rod 38, and thereupon this bar 35 is lowered, the free end of the lever 32 is lowered against the tension of the spring 34 and the bell crank lever 21 is shifted so as to cause a rotation of the shaft 20 in a clockwise direction through the instrumentality of the spring 28 and then through the arm 19, link 18, foot-pedal 15 and link 17, the clutch and brake mechanism 11 acts so as to stop the rotation of the shaft 10. This turning of the shaft 20 causes the rod 57 as above described, to be thrust forward into engagement with the lever 141, and this lever forces the end of the shaft 74 inwardly so that the clutch acts so as to cause the pulley 138 to turn the shaft 74 in the reverse direction and this causes the pinion 131 to drive the rack 132 toward the rear. Just before this return movement takes place, however, the upward movement of the head 163 has caused an engagement with the bar 162 which causes a lowering of the pins 156 so that the uncut ends of the strips 154 adjacent to the perforations 155 are easily swept off the table 151 of the machine so as not to interfere with new strips. The return movement of the carriage 3 continues until the stop 167 comes in contact with the lever 62 at which time, as above described, the bar 57 is forced out of engagement with the lever 141, and then the projection 137 from the pulley 138 ceases to engage the projections 136 because the spring 140 separates the ends of the bar 74, and then the carriage must come to rest because there is no force to move it farther. The return movement of the carriage is not interfered with by the pawl 112 because this pawl is beveled on its upper surface and the slot 111 is large enough to permit the free movement of this pawl by the inclination of the teeth in the master strip 113. Furthermore, the mechanism above described actuates the arm 69 so as to cause the pawl 71 to disengage from the ratchet 75 during the return movement when the carriage 3 is again at rest, and the pins 156 are held, as above described, in an elevated position because of the block 169 and connected parts, new strips are inserted and then the foot-pedal 15 is depressed by the operator, the same as before, and the above given cycle is repeated, and this may be done indefinitely as long as the machine is in use. The master guide 113 will remain unchanged as long as the spacing on the strips remains unchanged. If the spacing is changed it is obvious that the master strip must be changed to correspond, as above described.

While I have shown and described one embodiment of my invention, it is obvious that it is not restricted thereto, but is broad enough to cover all structures that come within the scope of the annexed claims.

Having thus described my invention, what I claim is:

1. In a machine of the class described, means for holding strips true, a master strip, means for feeding the strips forward step by step with a varying feed, according to the master strip, with periods of dwell long enough for the cutting operations, means for stopping the forward feed, means for releasing the remainder of the strips, means for reversing the forward movement of the strip moving mechanism, and means for placing the apparatus in condition to receive more strips.

2. In a machine of the class described, means for holding strips true, means for feeding the strips forward step by step with a varying and intermittent feed, means for cutting the strips while at rest, and between forward movements, means for stopping the forward feed of the strips, means for releasing what is left of the strips, means for reversing the forward movement of the strip feeding mechanism, and means for stopping the return movement of this mechanism.

3. In a machine of the class described, means for holding strips true, means for feeding the strips forward step by step, with a varying feed, according to the location of designs on the strips, means for severing the strips to conform to the designs thereon, means for stopping the forward movement of the strip carrying mechanism, means for reversing this movement, and means for stopping the return movement of the strip feeding mechanism.

4. In a machine of the class described, a slotted table with pins projecting therethrough, a master strip, and means for feeding the pins forward with a step by step movement with a varying feed depending upon the master strip shifted by said pins, when the device is in use.

5. In a machine of the class described, a pair of pins adapted to hold true a number of strips, a master strip, a slotted table through which said pins protrude so as to slide said strips on said table, mechanism for feeding said pins with a step by step movement, the steps being of varying length according to the master strip, and means for stopping the forward movement of the pins.

6. In a machine of the class described, a slotted table, pins protruding through said table, guides in which said pins move in the direction of their length, levers adapted to raise or lower said pins, and mechanism for moving said pins in said slots with an intermittent and varying feed.

7. In a machine of the class described, a slotted table, a master strip and pins with means connected to said master strip, said pins being adapted to slide through the slots in the table and engage strips and move the same on the table and means connected with the master strip for permitting the strips to be fed with a varying and intermittent feed according to the master strip.

8. In a machine of the class described, a table, a master strip, means connected to said master strip for feeding strips on said table with a varying and intermittent feed, and means for clamping said strips on said table during the period of dwell.

9. In a machine of the class described, a table and means connected therewith for feeding strips on said table with a step by step movement, said means embodying in its construction a master strip, and means for clamping the strips on said table during the period of dwell.

10. In a machine of the class described, a table with means for holding strips true thereon while moving on said table, a master strip connected to said moving means for moving the strips with a step by step movement with a varying feed according to the master strips, means for clamping the strips during the period of dwell, and means for severing said strips during said period of dwell according to the designs on said strips.

11. In a machine of the class described, a master strip, a table and means for moving a plurality of strips thereon with an irregular and intermittent movement according to the master strip, and holding said strips true while being moved, and means for severing said strips according to the designs thereon.

12. In a machine of the class described, a slotted table and pins passing through the same adapted to receive a plurality of strips which may be supported by the table, a rack bar connected to said pins and adapted to move the same in the slots of said table, and a master strip connected to said rack and adapted to limit the forward movements of the rack according to the designs on the strips.

13. In a machine of the class described, a table, a rack adjacent to the table, pins connected with said table and rack for shifting a plurality of strips on said table, a master strip adjacent to said rack, and means operating therewith for limiting the forward movement of the strip moving mechanism, so that the movements of the pins will conform to the master strips.

14. In a machine of the class described, a slotted table and means for supporting the same, pins protruding through the slots in the table and a rack bar supporting said pins, a master strip carried by said rack bar, means for driving said rack bar with an intermittent motion and means coöperating with said master strip for limiting the forward movements of the rack bar so that strips moved by the pins will be stopped after each movement according to the location of designs upon these strips.

15. In a machine of the class described, a rack and means for supporting the same, pins connected to said rack, a master strip secured to said rack, and means engaging said master strip for limiting the forward movement of said rack.

16. In a machine of the class described, a slotted rack, a master strip set in the slot of this rack, means for supporting the rack, means for engaging with the rack and shifting the same with an over feed, and means engaging with the master strip to limit the feed of the rack according to the master strip.

17. In a machine of the class described, a rack and means for supporting the same, a pinion meshing with said rack and adapted to drive the same forward, means for driving said pinion intermittently, means for limiting the forward movements of the rack so that they will terminate at irregular intervals, and a friction clutch connected to said pinion for permitting an excess movement of the shaft to which the pinion is connected without disturbing the pinion.

18. In a machine of the class described, means for cutting bands out of a series of blanks, means for feeding the blanks with an irregular and intermittent motion which keeps step with the cutting mechanism and causes the strips from which the blanks are severed to be placed properly under the cutting die, and mechanism for stopping the cutting mechanism and stopping the forward movement of the strips when all blanks have been cut therefrom.

19. In a machine of the class described, a die and means for reciprocating the same, a carriage and means for supporting the same, pins protruding from said carriage, a slotted table through which the pins protrude so as to move strips on said table and keep the strips in proper registration while being moved, means for moving the carriage so as to make it keep step with the die and in proper registration therewith whether the designs on said strips are placed at regular intervals or not, a clamping device for clamping the strips on the table during the cutting operation of the die, and mechanism for stopping the forward movement of the carriage when all blanks have been severed from said strips.

20. In a machine of the class described, a carriage having a rack, a master strip secured to the rack, levers connected to the rack, vertically disposed pins adapted to be raised and lowered by said levers, an arm running laterally from said rack, a bar secured to said arm and running parallel with said rack, and stops adapted to limit the forward and rear movement of the carriage adjustably carried by said bar.

21. In a machine of the class described, a table with slots therein, a clamp carried by said table and adapted to compress strips when the same are not moving, and means for actuating said clamp, means for shifting the pins in said slots so as to have the same shift strips carried by said table, means connected with said pins for causing the same to be raised or lowered, means for causing said pins to be lowered below the table top, and means for causing them to be held at an elevated position at the rearward limit of their movement.

22. In a machine of the class described, a frame carrying a reciprocating die, and means for shifting the die so that it will rise and fall, a bracket fixed to the die carrying means provided with a projection, and a projecting rod adapted to be shifted in the path of said projection, a carriage and means for supporting the same, means for feeding it forward, a projection from said carriage adapted to force said rod under said first mentioned projection, and mechanism connected with said rod for stopping the reciprocations of said die, and the forward feed of said carriage.

23. In a machine of the class described, a reciprocating die and means for mounting the same, means for driving the same, a carriage adjacent to said die and a table adjacent to said carriage, the latter for carrying, the former for shifting with an irregular and intermittent motion a plurality of strips, a treadle and mechanism connected therewith for starting the machine when the same is depressed at its forward end, a stop for limiting the forward movement of said carriage, a reversing mechanism for returning the carriage to its initial position, and means for stopping the carriage when so returned.

Signed at the city, county and State of New York, this 23rd day of November, 1915.

FRANCIS X. MALOCSAY.